F. H. Keeney,
Hanging Saws.

N° 13,357      Patented July 31, 1855.

UNITED STATES PATENT OFFICE.

F. H. KEENEY, OF NEWPORT, KENTUCKY.

CIRCULAR-SAW MANDREL.

Specification of Letters Patent No. 13,357, dated July 31, 1855.

*To all whom it may concern:*

Be it known that I, FIELDING H. KEENEY, of Newport, in the county of Campbell and State of Kentucky, have invented a new and useful improvement for circular saws or any other mandrels used for such purposes, whereby the saw can be set to cut a groove or kerf of any required width at one cut; and I do hereby declare that the following is a full, clear, and exact description of the construction and operation of the same, reference being had to the annexed drawings, making a part of this specification.

Figure 1:
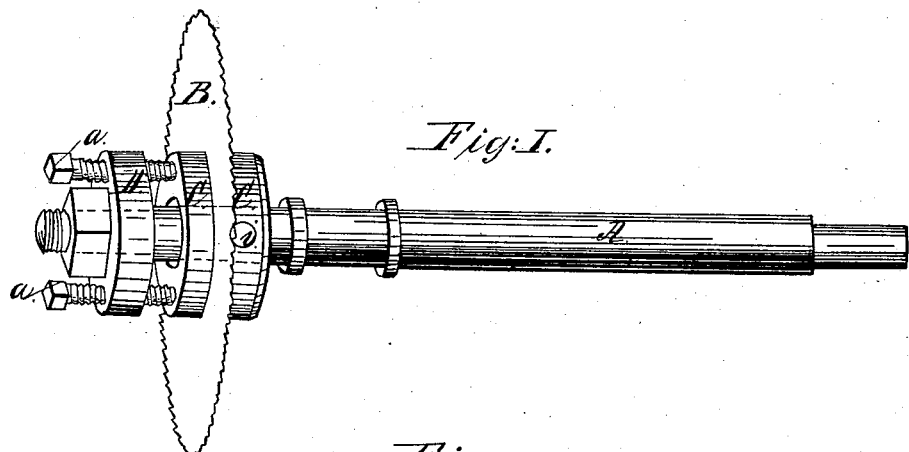
Figure 3:
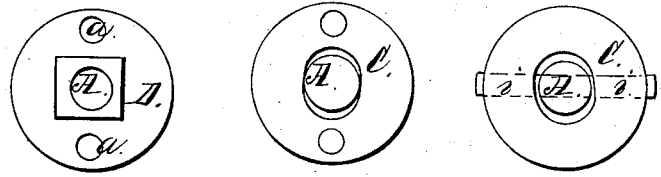
Figure 2:
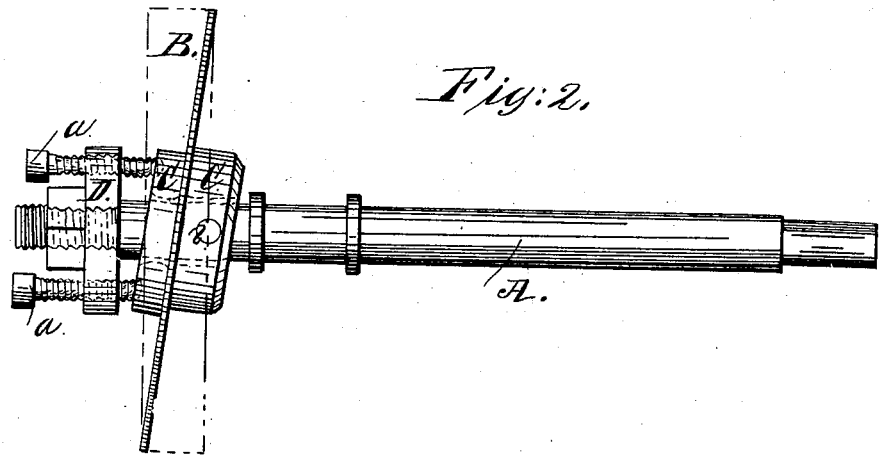

Figure 1 is a perspective view. Fig. 2 is a longitudinal elevation. Fig. 3 is a view of the collars.

I make a shaft (A) in the ordinary way with bearings in any of the known ways; then instead of using a tight collar for the saw to rest against I make a collar or collars (C) as represented in Fig. 3, with a hole larger one way than the other, with a pin or pivot ($i$) through the collar and shaft, so that it may move back in an oblique direction on the shaft, as represented in Fig. 2, by screwing up or unscrewing the set screws ($a$, $a$), which screw in a stationary collar (D) on the shaft, so that the set screws may set at right angles with the pin in the vibrating collars. The set screws also rest against a collar or washer, as represented in Figs. 1 and 2, so that when screwed up again the saw may hold it tight and firm between the collars at right angles with the shaft or at any angle you see proper, as represented in Fig. 2, so that as the shaft revolves each part of the saw may cut its each part of the kerf or groove, thereby cutting it any breadth (you may see proper to set it) at one cut or each revolution of the saw.

What I claim as my invention and desire to secure by Letters Patent is—

The mode of making a mandrel herein set forth in the above specification, not confining myself to exact size or shape as herein described but to the principle of the machine as herein set forth or any other equivalent device for to produce the same effect.

FIELDING H. KEENEY.

Witnesses:
JULIUS F. DYER,
JOHN ORMOND.